(No Model.)
N. W. R. READ.
FLUSHING TANK.
No. 306,523. Patented Oct. 14, 1884.
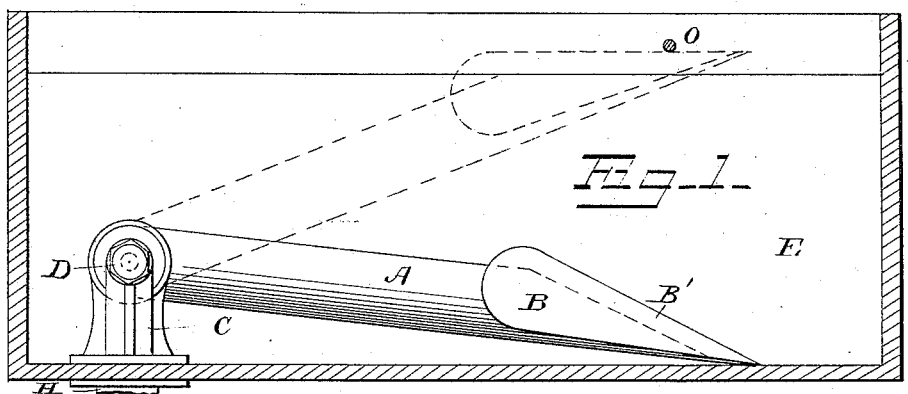
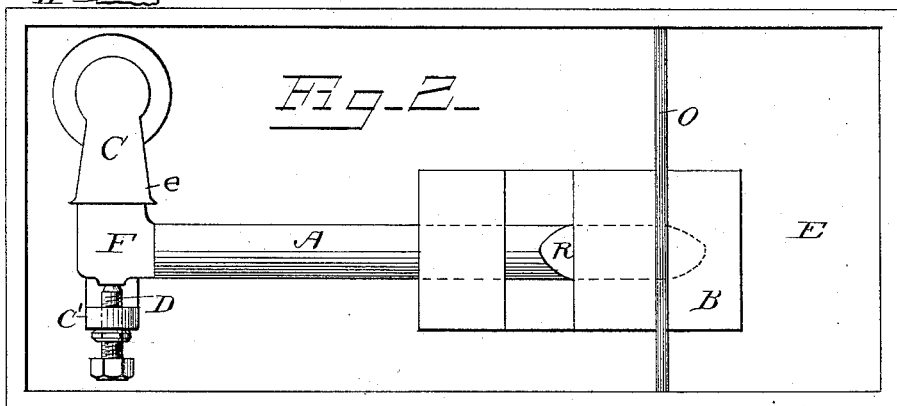
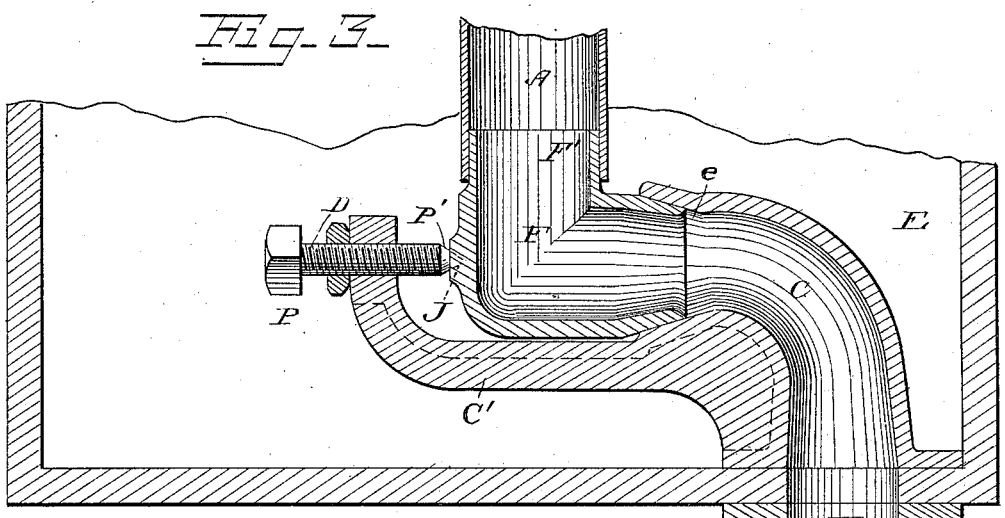
WITNESSES
F. L. Ourand,
John T. Suter Jr.
INVENTOR
N. W. R. Read
Fouts & Thomas
Attorneys

UNITED STATES PATENT OFFICE.

NOEL WILLIAM RUDSTON READ, OF DENVER, COLORADO.

FLUSHING-TANK.

SPECIFICATION forming part of Letters Patent No. 306,523, dated October 14, 1884.

Application filed October 13, 1883. (No model.)

*To all whom it may concern:*

Be it known that I, NOEL W. RUDSTON READ, a citizen of the United States, residing at Denver, in the county of Arapahoe and State of Colorado, have invented certain new and useful Improvements in Flushing-Tanks, of which the following is a specification, reference being had therein to the accompanying drawings.

My invention relates to a flushing-tank in which a pivoted float provided with an opening is used, all of which will be more fully hereinafter specified, and pointed out in the claims.

In the accompanying drawings, Figure 1 is side view of my device, the tank being in section. The dotted lines in this view represent the pivoted float resting under the cross-rod in the top of the tank. Fig. 2 is a plan view. Fig. 3 is a transverse section on the pivotal axis of the float.

Like letters indicate like parts throughout the several views.

E represents the tank, provided with the outlet H. Transversely fixed near the top of the tank, near one end, is a rod, O.

C is a pipe suitably secured to the bottom of the tank. The lower end of this pipe communicates with the tank-opening H.

F is an elbow-joint pivoted between the flaring mouth $e$ of the pipe C and the thumb-screw P.

C' is an arm curved upward and formed integral with the pipe C. The upper end of the arm C' is provided with a threaded opening for the reception of the threaded shank of the thumb-screw P. Said thumb-screw has a point, P', which fits into a socket, J, in the side of the elbow F, whereby the elbow is pivotally secured between the point of the thumb-screw and the flaring end of the pipe C.

D is a jam-nut on said screw.

A is a pipe suitably secured to the swinging end F' of the elbow F. B is an open float fixed to the loose open end of the pipe A.

The operation of the device is as follows: By admitting water into the tank E the pipe A and float B will rise therewith. In the rise of the pipe and float the water does not reach the mouth B' of the float until said float is arrested in its upward movement by the cross-rod O, when the water will rise above the mouth and fill the pipe A, which action will cause the pipe and float to fall to the bottom of the tank and the water to escape through the pipe A, elbow F, and pipe C, and pass out the tank through the opening H.

Having thus described my invention, I claim as new and desire to secure by Letters Patent—

1. In combination with a flushing-tank, the pipe C, secured to the bottom of the tank, and provided with an opening, H, the joint F, thumb-screw P, provided with a joint, P', adapted to fit in the socket J, whereby the elbow is pivotally secured to the swinging end F', the arm C', having a threaded opening, formed integral with the pipe C, and the float B, fixed to the loose open end of the pipe A, all substantially as described, and for the purposes set forth.

2. The pipe C, having threaded arm C', provided with screw P, in combination with the elbow F, pipe A, and float B, as specified.

In testimony whereof I affix my signature in the presence of two witnesses.

NOEL WM. RUDSTON READ.

Witnesses:
 ROBT. H. STORRS,
 H. N. McCULLOH.